(12) United States Patent
Kabannik

(10) Patent No.: US 12,006,815 B2
(45) Date of Patent: Jun. 11, 2024

(54) METHOD AND SYSTEM FOR MONITORING A WELLBORE OBJECT USING A REFLECTED PRESSURE SIGNAL

(71) Applicant: Schlumberger Technology Corporation, Sugar Land, TX (US)

(72) Inventor: Artem Valeryevich Kabannik, Novosibirsk (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 94 days.

(21) Appl. No.: 16/944,861

(22) Filed: Jul. 31, 2020

(65) Prior Publication Data

US 2021/0032984 A1 Feb. 4, 2021

(30) Foreign Application Priority Data

Jul. 31, 2019 (WO) ................ PCT/RU2019/000537

(51) Int. Cl.
*E21B 47/095* (2012.01)
*E21B 43/26* (2006.01)
(Continued)

(52) U.S. Cl.
CPC ............ *E21B 47/095* (2020.05); *E21B 43/26* (2013.01); *E21B 47/06* (2013.01); *E21B 47/18* (2013.01);
(Continued)

(58) Field of Classification Search
CPC ........ E21B 47/095; E21B 43/26; E21B 46/07; E21B 47/18; G01V 1/307; G01V 1/364;
(Continued)

(56) References Cited

U.S. PATENT DOCUMENTS

| 3,488,629 A | 1/1970 | Claycomb |
| 3,555,504 A | 1/1971 | Fields |

(Continued)

FOREIGN PATENT DOCUMENTS

| WO | 2007095153 A1 | 8/2007 |
| WO | 2008118986 A1 | 10/2008 |

(Continued)

OTHER PUBLICATIONS

Holzhausen, G.R. et al., "Impedance of Hydraulic Fractures: Its Measurement and Use for Estimating Fracture Closure Pressure and Dimensions", SPE-13892-MS, presented at the SPE/DOE Low Permeability Gas Reservoirs Symposium, Denver, Colorado, USA, 12 pages.

(Continued)

*Primary Examiner* — Michael J Dalbo
*Assistant Examiner* — Kaleria Knox
(74) *Attorney, Agent, or Firm* — Jeffrey D. Frantz

(57) ABSTRACT

The present disclosure relates to a method and system for monitoring a wellbore object using a reflected pressure signal. The method discloses providing at least one pump for performing hydraulic fracturing or a source of hydraulic pulse so that pressure signal propagates along the wellbore and reflects from the borehole objects; providing pressure sensor at wellhead; preprocessing of registered reflected pressure signal and pump noise; transforming the registered reflected pressure signal and pump noise from the frequency domain into time-frequency representation with Short Time Fourier Transform (STFT), computing a pump noise mask; applying the pump noise mask to the STFT representation to obtain a filtered reflected pressure signal; processing of the filtered reflected pressure signal for determining the reflection time from the downhole object, calculating the depth of the downhole object from reflected pressure signal by mul- (Continued)

tiplying of the reflection time by the pressure signal propagation velocity. This method allows to perform wellbore monitoring without stop of current operations.

16 Claims, 12 Drawing Sheets

(51) Int. Cl.
    *E21B 47/06* (2012.01)
    *E21B 47/18* (2012.01)
    *G01V 1/30* (2006.01)
    *G01V 1/36* (2006.01)
    *G01V 1/50* (2006.01)

(52) U.S. Cl.
    CPC .............. *G01V 1/307* (2013.01); *G01V 1/364* (2013.01); *G01V 1/50* (2013.01); *G01V 2210/324* (2013.01)

(58) Field of Classification Search
    CPC .... G01V 1/50; G01V 2210/324; G01V 1/306; G01M 3/2807; G10H 3/125
    See application file for complete search history.

(56) References Cited

U.S. PATENT DOCUMENTS

| | | | |
|---|---|---|---|
| 3,716,830 A | 2/1973 | Garcia | |
| 4,642,800 A | 2/1987 | Umeda | |
| 4,730,281 A | 3/1988 | Rodney et al. | |
| 4,802,144 A | 1/1989 | Holzhausen et al. | |
| 5,146,433 A | 9/1992 | Kosmala et al. | |
| 6,741,185 B2 | 5/2004 | Shi et al. | |
| 7,577,528 B2 | 8/2009 | Li et al. | |
| 2005/0086005 A1* | 4/2005 | Taner | G01V 1/306 702/14 |
| 2006/0017923 A1* | 1/2006 | Ruchti | G01J 3/28 356/326 |
| 2006/0155535 A1* | 7/2006 | Puterbaugh | G10H 3/125 704/231 |
| 2007/0263488 A1 | 11/2007 | Clark | |
| 2010/0265094 A1 | 10/2010 | Zannoni et al. | |
| 2010/0314169 A1 | 12/2010 | Jarrot et al. | |
| 2016/0356665 A1* | 12/2016 | Felemban | G01M 3/2807 |
| 2017/0138176 A1 | 5/2017 | Keilers | |

FOREIGN PATENT DOCUMENTS

| | | | |
|---|---|---|---|
| WO | 2012027633 A2 | 3/2012 | |
| WO | 2001086325 | 11/2015 | |
| WO | 2018004369 A1 | 1/2018 | |
| WO | WO-2018004369 A1 * | 1/2018 | ............. E21B 43/26 |

OTHER PUBLICATIONS

Parkhonyuk, S. et al., "Measurements While Fracturing: Nonintrusive Method of Hydraulic Fracturing Monitoring", SPE-189886, presented at the SPE Hydraulic Fracturing Technology Conference and Exhibition, The Woodlands, Texas, 9 pages.

International Search Report and Written Opinion of International Application No. PCT/RU2019000537 dated Apr. 23, 2002, 8 pages.

\* cited by examiner

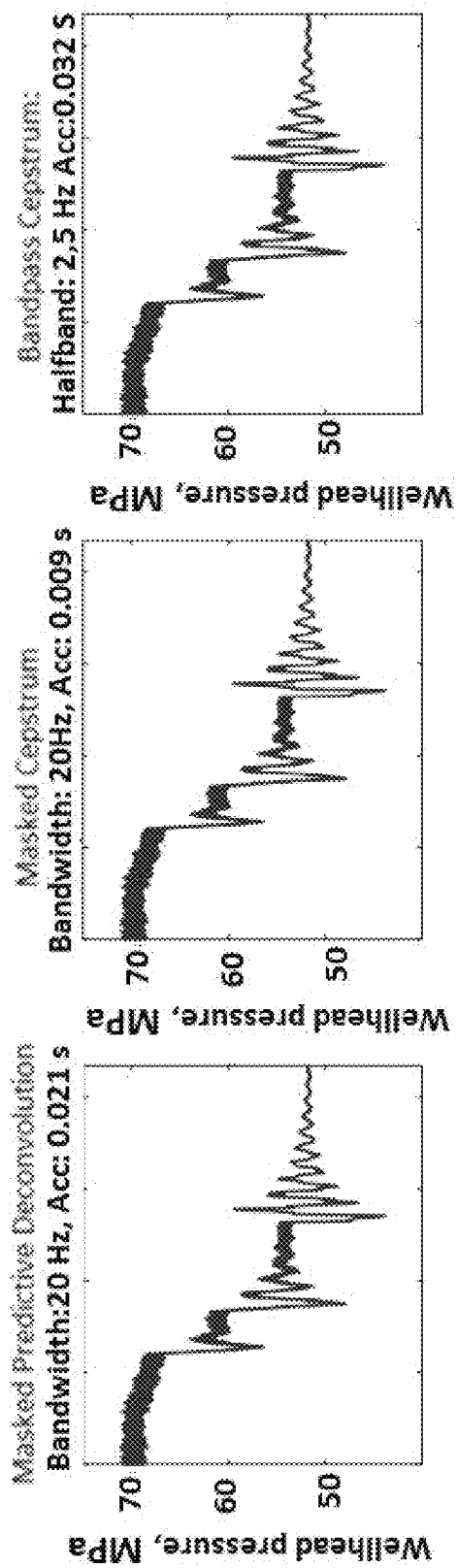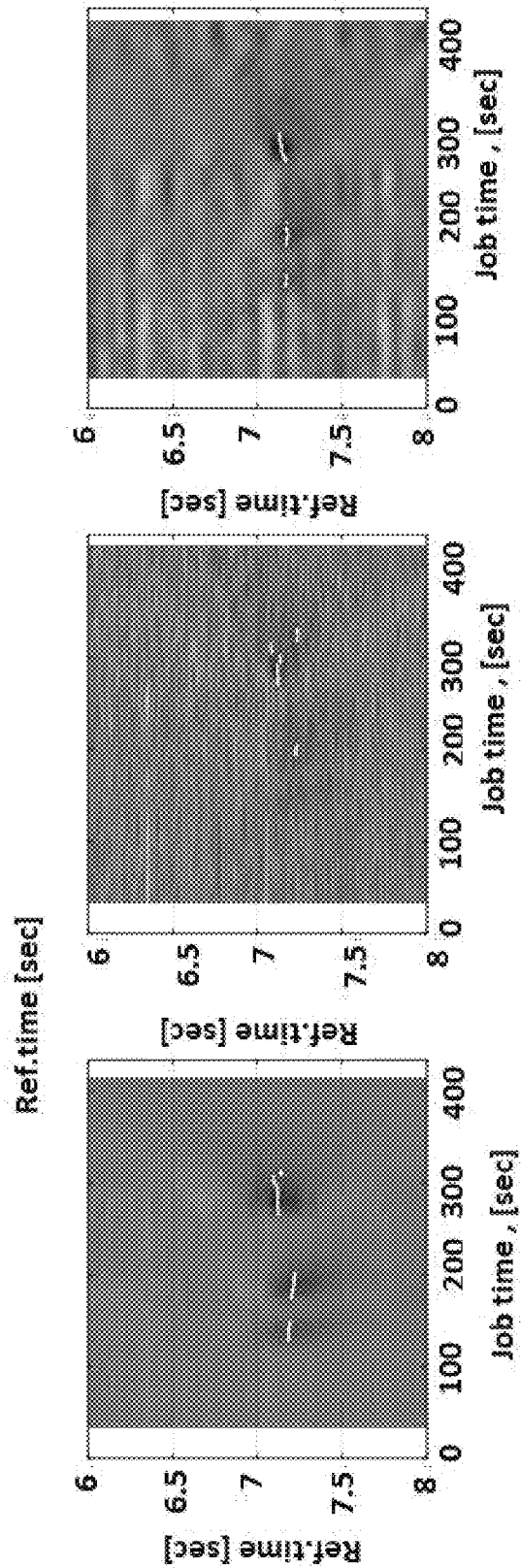
FIG. 10A  FIG. 10B  FIG. 10C

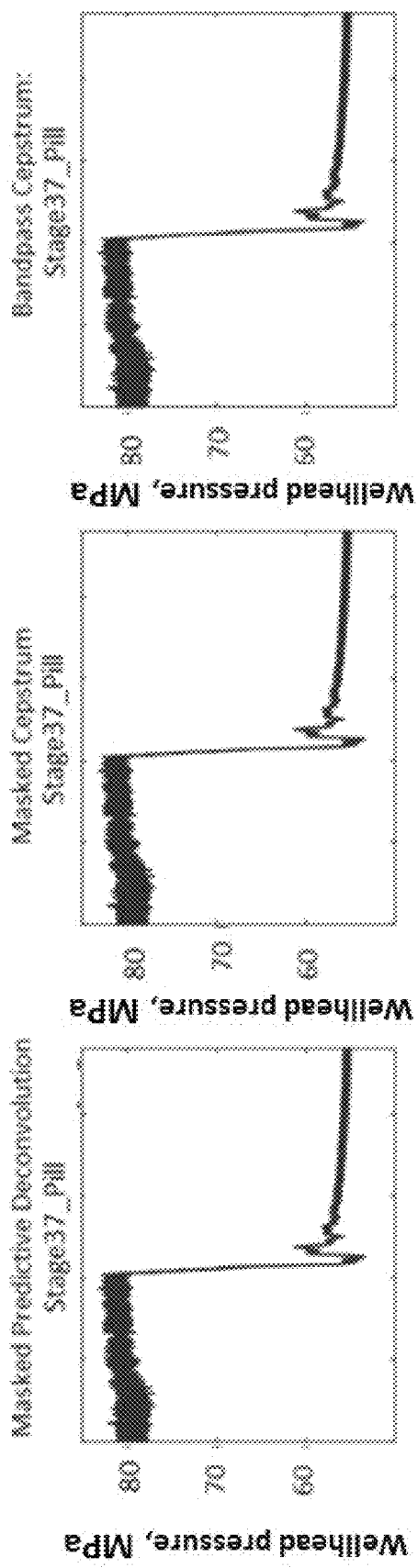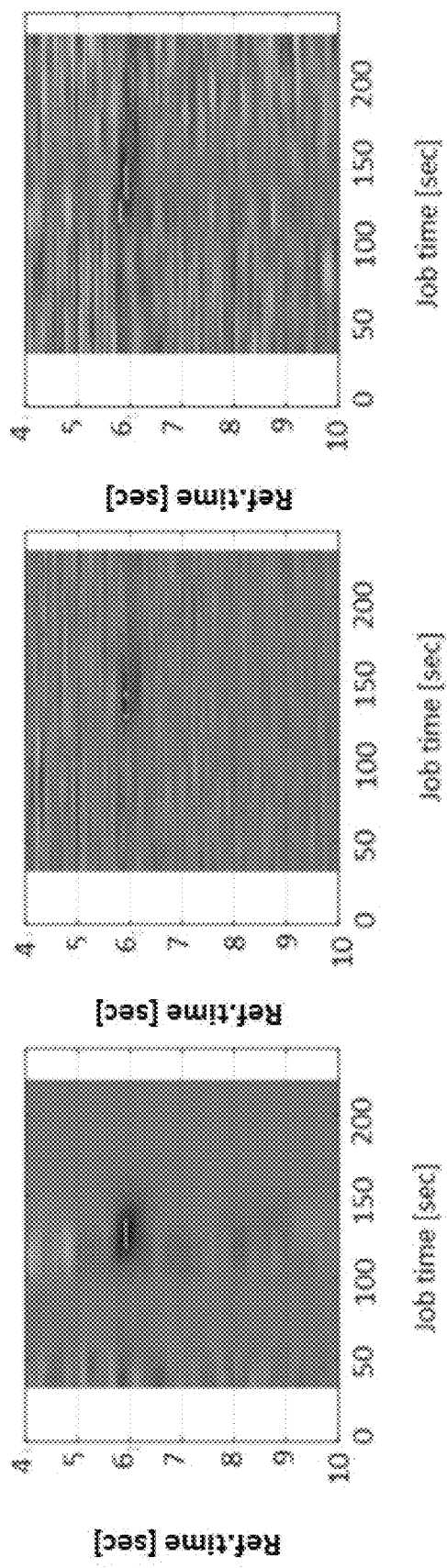
FIG.12A  FIG.12B  FIG.12C

METHOD AND SYSTEM FOR MONITORING A WELLBORE OBJECT USING A REFLECTED PRESSURE SIGNAL

CROSS-REFERENCE TO RELATED APPLICATIONS

This application claims the benefit of the filing date of International Patent Application Ser. No. PCT/RU2019/000537, filed Jul. 31, 2019, entitled "A METHOD AND SYSTEM FOR MONITORING A WELLBORE OBJECT USING A REFLECTED PRESSURE SIGNAL"

FIELD OF THE DISCLOSURE

The present application relates to tube wave analysis for hydraulic fracturing characterization, drilling mud pulse telemetry, cementing monitoring, and wireless telemetry in well testing.

An intense pressure pulse (also known as a tube wave) generated in a well propagates along the wellbore with low attenuation and its reflections from downhole objects are recorded at the surface as pressure oscillations. Those pressure oscillations are most often caused by a sudden flow rate changes in a wellbore called water (fluid) hammers. Examples of the downhole objects that reflect tube waves (downhole reflectors) might be hydraulic fractures, wellheads, well bottoms, a joint of casing pipes of different diameters and other completion elements, wellbore tool, obstacle preventing direct propagation of pressure signal, such as gravel packing, obstacles of wellbore tools, rock dumps.

Fundamentals of pressure oscillations analysis for hydraulic fracturing treatments characterization were established by (Holzhausen, G., & Gooch, R. (1985). Impedance of Hydraulic Fractures: Its Measurement and Use for Estimating Fracture Closure Pressure and Dimensions (SPE-13892-MS). SPE-13892-MS) and (Holzhausen, G. R., & Lawrence, W. S. (1986). U.S. Pat. No. 4,802,144A). Examples of using of tube wave analysis for other oilfield applications include mud pulse telemetry in measurements while drilling, cement top monitoring in cementing, microseismic monitoring and wireless telemetry in well testing.

The new automatic approach to the pressure oscillation analysis based on cepstrum algorithm in application to hydraulic fracturing treatments was suggested in "Method and System for Identification of Wellbore Objects with Hydraulic Signal Reflected", WO2018004369, 2016 and further developed in "Measurements While Fracturing: Non-intrusive Method of Hydraulic Fracturing Monitoring. SPE-189886" (Parkhonyuk et al, 2018). According to the described method before applying cepstrum processing to the signal it is preprocessed with a bandpass filter implemented as Gaussian derivative filter. The goal of this pre-processing stage is extraction of the wellbore reflectivity signal from the raw pressure signal and suppression of the noise. In frequency domain this noise is characterized by narrow peak at zero frequency related to the slow pressure variations, narrow harmonic peaks caused by hydraulic pump strokes and broadband electronic noise. There are the narrow harmonic pump noise peaks, that will be dealt with in this invention, because they overlap with the useful signal and result in most severe ambiguity in the reflection time determination.

The Gaussian derivative effectively removes the noise, by preserving the low frequency content (excluding the zero frequency component) where the useful signal is located and filtering out the high frequency part mostly occupied by the noise.

BACKGROUND

Different noise filtering methods are known from the prior art, for example, in US20070263488, Schlumberger Technology Corp, 2006, "Wellbore telemetry and noise cancellation systems and method for the same" disclosed is a method of signal processing includes providing at least a first pressure sensor and a second pressure sensor spaced in a drilling system and using an algorithm to separate the downwardly propagating waves from the upwardly propagating waves. In one or more examples, an algorithm may include determining a velocity of pressure signals in a wellbore, time-shifting and stacking pressure signals from at least the first pressure sensor and the second pressure sensor to determine a downwardly propagating noise signal, and subtracting the downwardly propagating noise signal from at least the signal from the first pressure sensor.

However, the implementation of noise filtering is different since it is based on separation of downwardly propagating noise signal from the upwardly propagating pressure waves with the array of sensors.

Another solution is known from U.S. Pat. No. 7,577,528, Baker Hughes Inc, 2006, "System and method for pump noise cancellation in mud pulse telemetry". In said invention pump noise in a mud-pulse telemetry system is reduced based on analysis of the frequency characteristics of the noise generated by one or more pumps. Least mean-squares filtering may be done. Alternatively, the frequency domain analysis of the pump frequencies is fine-tuned in the time domain and a synthetic timing signal is used for the filtering.

However, the implementation of noise filtering is different since it is based on creating the pump noise reference signal in the time domain (in time coordinates) that is used for adaptive tuning of the pump noise filter. The adaptive filter is applied to the signal afterwards.

Another solution is known from U.S. Pat. No. 4,730,281, Baroid Technology Inc, 1985, Data processing filtering method and apparatus.

A bucket brigade filter is disclosed having a feedback loop resulting in a tight comb structure filter response whereby a periodic noise and all its harmonics may be removed from a signal. Scalers featuring selectively variable scaler parameters permit prompt adaptation to changes in the noise period, rapid initialization of the filter to an operating condition and adjustable stopband widths of the filter frequency response. Sampling of the input data signal may be synchronized to the periodic variations of the noise to be eliminated from the signal.

Therefore, there is a need in more reliable and accurate sophisticated pump noise suppression approach with minimal useful signal distortion.

SUMMARY

This disclosure relates to a method and system for monitoring a wellbore object using a reflected pressure signal. The method discloses providing at least one pump for performing hydraulic fracturing or a source of hydraulic pulse so that pressure signal propagates along the wellbore and reflects from the borehole objects; providing pressure sensor at wellhead for registering the pressure signal; pre-processing of registered reflected pressure signal and pump noise; transforming the registered reflected pressure signal and pump noise from the frequency domain into time-frequency representation with Short Time Fourier Transform (STFT), computing a pump noise mask by approximating the pump noise signal in STFT representation with a linear combination of comb shape functions; applying the pump noise mask to the STFT representation of the transformed reflected pressure signal and pump noise to suppress the pump noise and to obtain a filtered reflected pressure signal; processing of the filtered reflected pressure signal for determining the reflection time from the downhole object, calculating the depth of the downhole object from reflected pressure signal by multiplying of the reflection time by the pressure signal propagation velocity.

Examples of processing masked water hammer signals in the STFT domain with cepstrum and predictive deconvolution show robust pressure pulse travel time determination for hydraulic fracturing treatment analysis.

BRIEF DESCRIPTION OF DRAWINGS

FIG. 3B shows fundamental frequencies amplitude vector a.

FIG. 10A shows an example of processing of the stage-down water hammer by predictive deconvolution with comb filter.

FIG. 10B shows an example of processing by cepstrum with comb filter.

FIG. 10C shows an example of processing by cepstrum filtered with adaptive bandpass.

FIG. 12A shows an example of processing of water hammer events caused by pumping chemical pills by predictive deconvolution with comb filter.

FIG. 12B shows an example of processing by cepstrum with a comb filter.

FIG. 12C shows an example of processing by cepstrum filtered with adaptive bandpass.

DETAILED DESCRIPTION

The method described in this disclosure precisely locates and suppresses the pump noise harmonic peaks without affecting of the useful signal. The filtering is performed by applying a mask to time-frequency representation of non-stationary signals such as Short Time Fourier Transform (STFT). The mask is computed from the pump noise approximated with comb shape basis functions. Signal filtering is performed by element-wise multiplication of the mask with the STFT of the signal. The filtered signal can either be converted back to time domain with the inverse STFT for further processing or processed directly in frequency domain to determine the reflection times of the downhole objects. As a result, the reflection times are determined with high resolution, that, in turn, are used to determine the depths and nature of corresponding wellbore reflectors.

Periodic pressure pulses are induced by a hydraulic signal source such as pressure strokes of reciprocal pump operation, a perforation shot, etc.

Figure 1A:
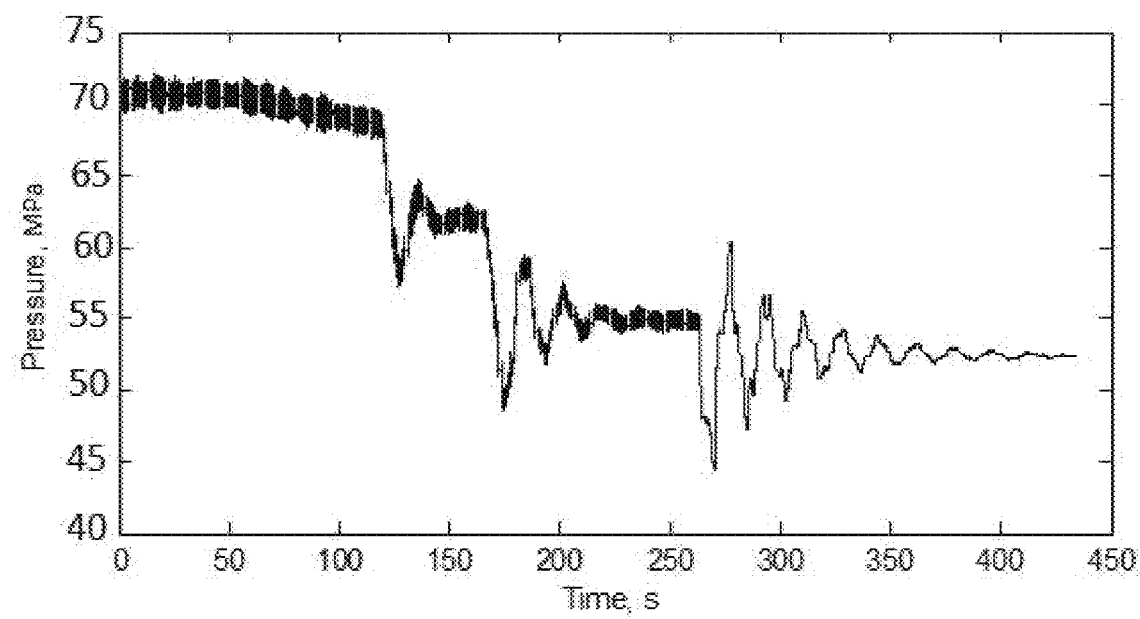
FIG. 1A shows a typical water hammer event in a wellbore.
Figure 1B:
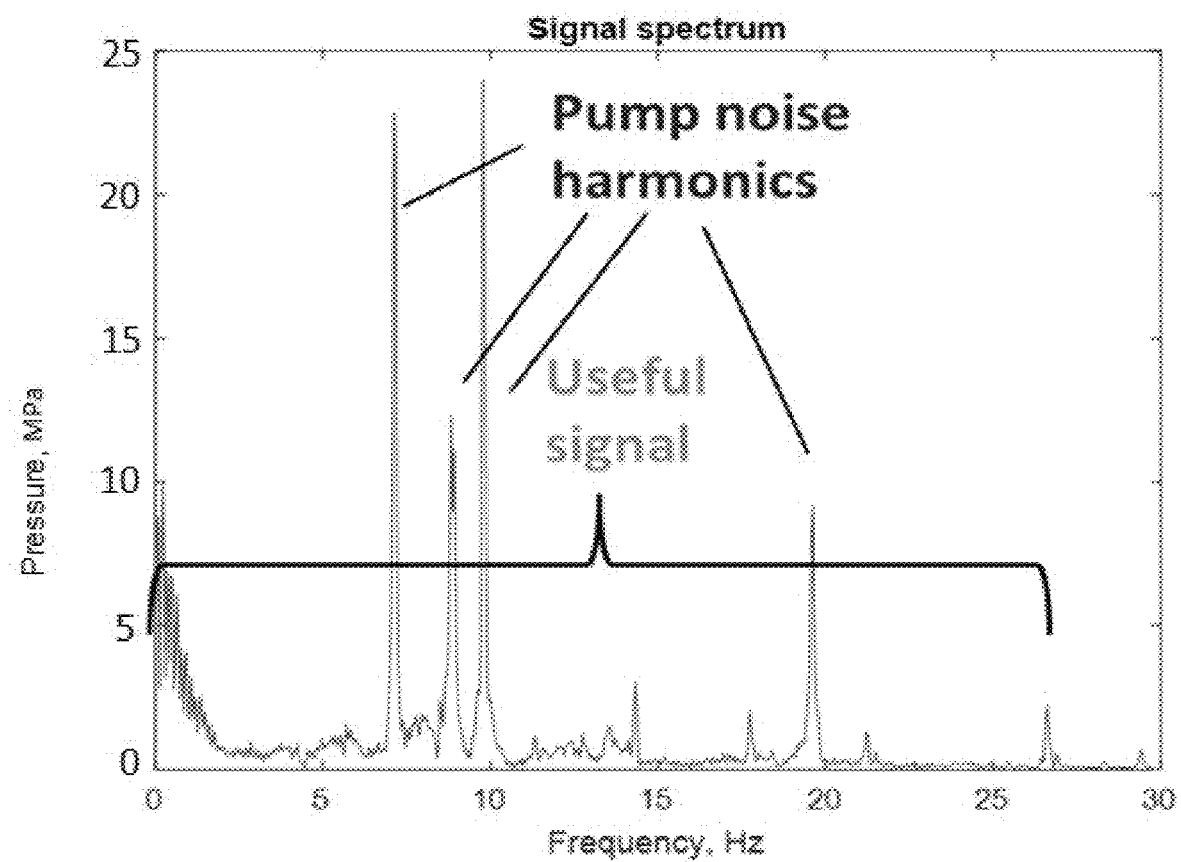
FIG. 1B shows amplitude spectrum of water hammer event in a wellbore.

A typical water hammer event generated by pump rate stage downs in the end of the treatment stage is shown in FIG. 1A and FIG. 1B, wherein on FIG. 1A depicted is a typical water hammer event (a tube wave caused by a drastic change in the flow rate), and a typical water hammer amplitude spectrum is depicted in FIG. 1B. Due to overlap between the noise and the useful signal, if the bandpass filtering is applied, the noise is removed with the cost of narrowing down the useful signal bandwidth to 2-3 Hz (which causes resolution degradation). Ultimately, one always must balance between the signal resolution and robustness of the solution: increasing of the signal bandwidth improves the resolution but the noise introduces many other peaks, that makes reflection time tracing less stable. On the other hand, decreasing the signal bandwidth results in more robust tracing of the reflection time peak, but one becomes less certain about the peak position due to its width increase.

Pump Noise Masking

In the present section of the description considered is a simplified model of a pressure signal generated by a single (hydraulic fracturing) stroke-operating pump. This simple model can be extended to any number of pumps with their own spectrum of noise.

Figure 2A:
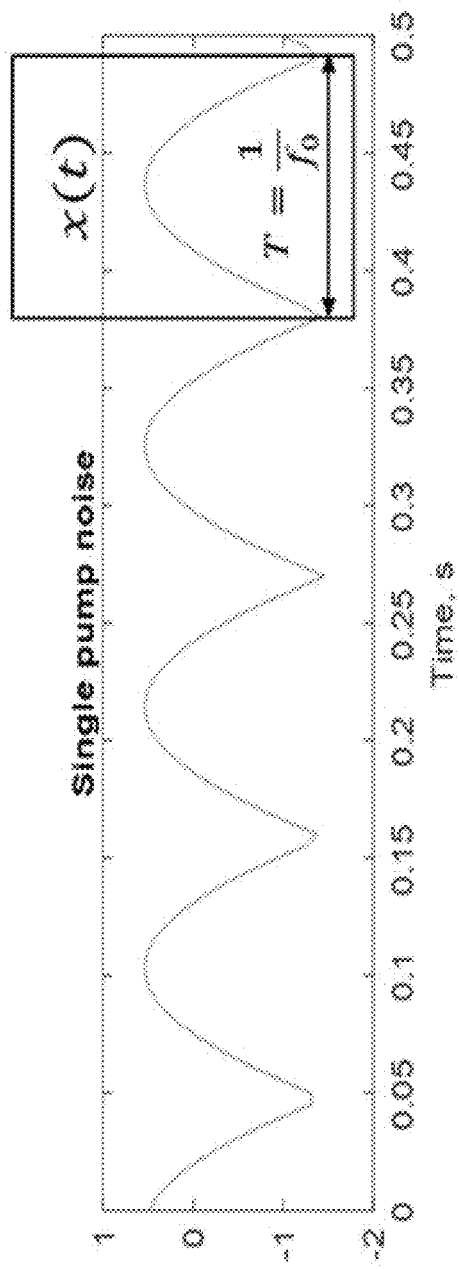
FIG. 2A shows a pump noise in time domain.

Let us assume that the hydraulic pump generates same pressure signature $x(t)$ every T seconds. This pattern can be associated either with one piston stroke as it is shown on FIG. 2A or with one revolution of the pump shaft that might include several strokes. For simplicity it will be further assumed that all strokes have the same signature that will be denoted by $x(t), t \in [0, T]$. If the signal is sampled with sampling period of $t_s$ we can introduce pump stroke length measured in samples $$N = \frac{T}{t_s}.$$

Then discrete pump noise signal combined from series of single strokes with period of N can be expressed with recurrent expression:

$$\gamma[n] = x[n] + \alpha\gamma[n-N] \quad (1)$$

Here n=0,1,2 ... is a sample number and α controls the model stability (α=1 in our simplified model). In the z-domain the expression (1) takes the following compact form:

$$Y(z) = \frac{X(z)}{1 - \alpha z^{-N}} \quad (2)$$

Where X(z) and Y(z) are z-transforms of single stroke signal x[n] and pump noise signal γ[n] respectively. The magnitude response of pump noise in frequency domain will be obtained by evaluation of (2) on unit circle $z=e^{-i2\pi f/f_s}$, where $$f_s = \frac{1}{t_s}$$

is sampling rate.

$$Y(f, f_0) = \frac{X(f)}{\sqrt{1 + \alpha^2 - 2\alpha \cdot \cos 2\pi f/f_0}} \quad (3)$$

Figure 2B:
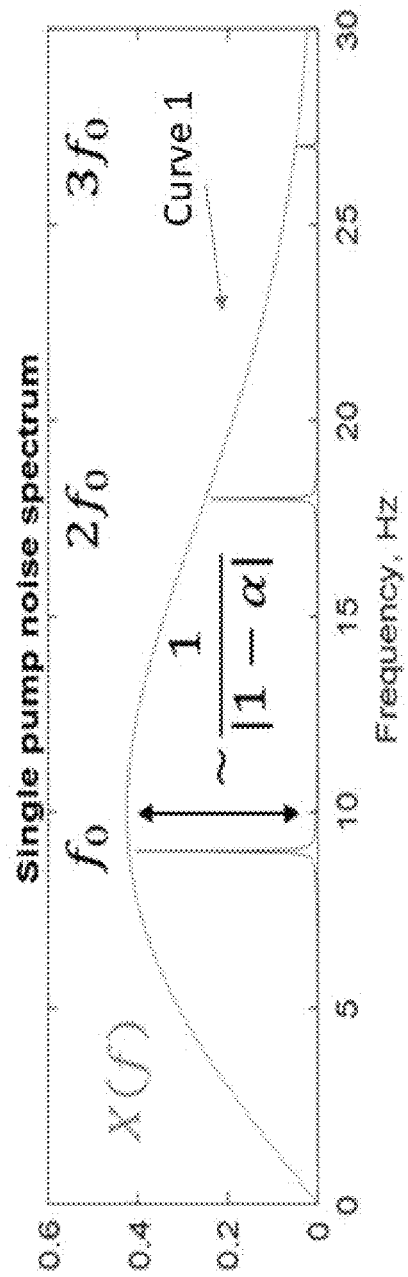
FIG. 2B shows pump noise in frequency domain.

The structure of pump noise magnitude spectrum response defined by (3) is shown on FIG. 2B. The magnitude response has comb shape and is a train of harmonic peaks located at fundamental frequency $$f_0 = \frac{1}{T}$$

and its multiples ($2f_0$, $3f_0$, $4f_0$, ...); the peak heights are determined by proximity of parameter α to 1 (the spectrum has singularity when α=1); the bandwidth of the pump noise signal is determined by magnitude response of a single stroke X(f) represented by curve 1 that modulates the comb peaks.

The comb shape magnitude response function Y(f, $f_0$) approximates pump noise for single pump in frequency domain. In case of the multiple pump noise presence it can be approximated as a linear combination of single pump comb functions:

$$H(f) = \Sigma_{i=1}^M \alpha_i Y(f, f_0^i) \quad (4)$$

Where fundamental frequencies $f_0^i$ belong to predefined fundamental frequency interval: $f_0^1, f_0^2, f_0^3, \ldots f_0^M \in [f_0^{Start}, f_0^{End}]$.

Let us introduce a comb function matrix:

$$Y = \begin{bmatrix} | & | & & | \\ Y(f, f_0^1) & Y(f, f_0^1) & \ldots & Y(f, f_0^M) \\ | & | & & | \end{bmatrix}$$

where each Y(f, $f_0^i$) act as a column of Y. We can also introduce a magnitude response of pump noise that we want to approximate as a column vector:

$$h = \begin{bmatrix} | \\ H(f) \\ | \end{bmatrix}$$

Then the expression (4) becomes a system of linear equations:

$$Y\alpha = h \quad (5)$$

Here α is the unknown column vector of fundamental frequency amplitudes:

$$a = \begin{bmatrix} | \\ a(f_0) \\ | \end{bmatrix}$$

The system (5) is solved as regularized least squares $$\|Y\alpha - h\|^2 + \gamma\|\alpha\|^2 \to \min \quad (6)$$

Which is equivalent to solving of linear equation system $Y^T(Y - \gamma I)\alpha = Y^T h$, where γ is regularization parameter.

Figure 3A:
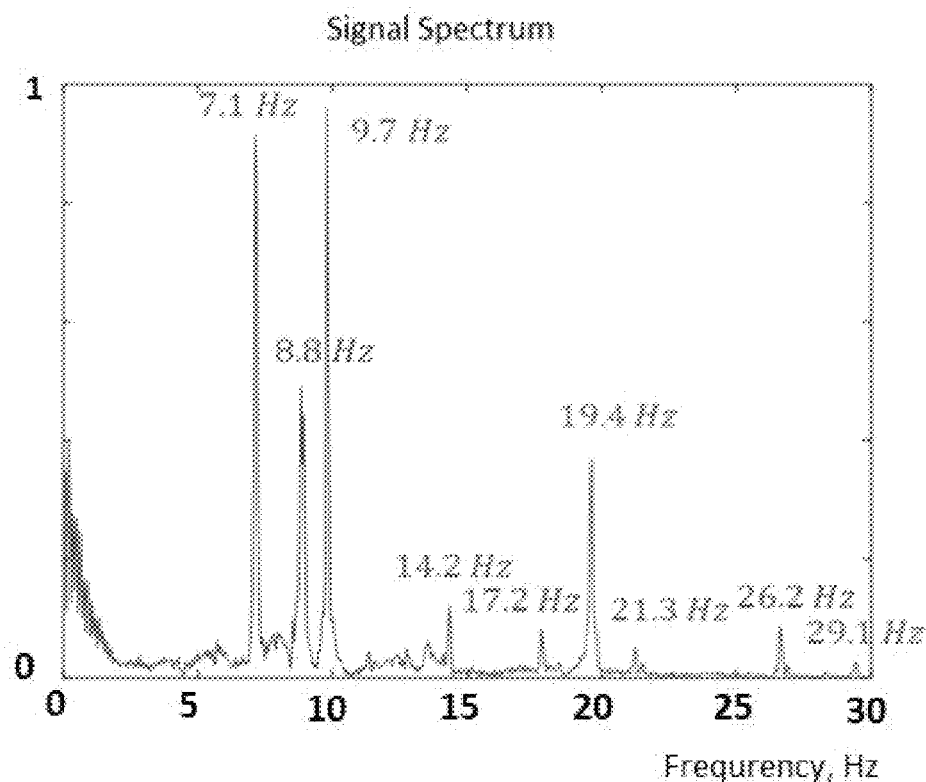
FIG. 3A shows a magnitude response vector of the input signal h.

An example of right-hand side vector h of system (5) is shown in FIG. 3A. It is a signal magnitude response in frequency domain obtained by taking absolute value of Fourier transform of the input signal. As it has been mentioned, in general it contains wellbore response, harmonic pump noise and random background noise components. The comb functions Y approximate only harmonic pump noise components of the signal h, so the $\|Y\alpha = h\|^2$ term of the equation (6) will never be zero.

Figure 3B:
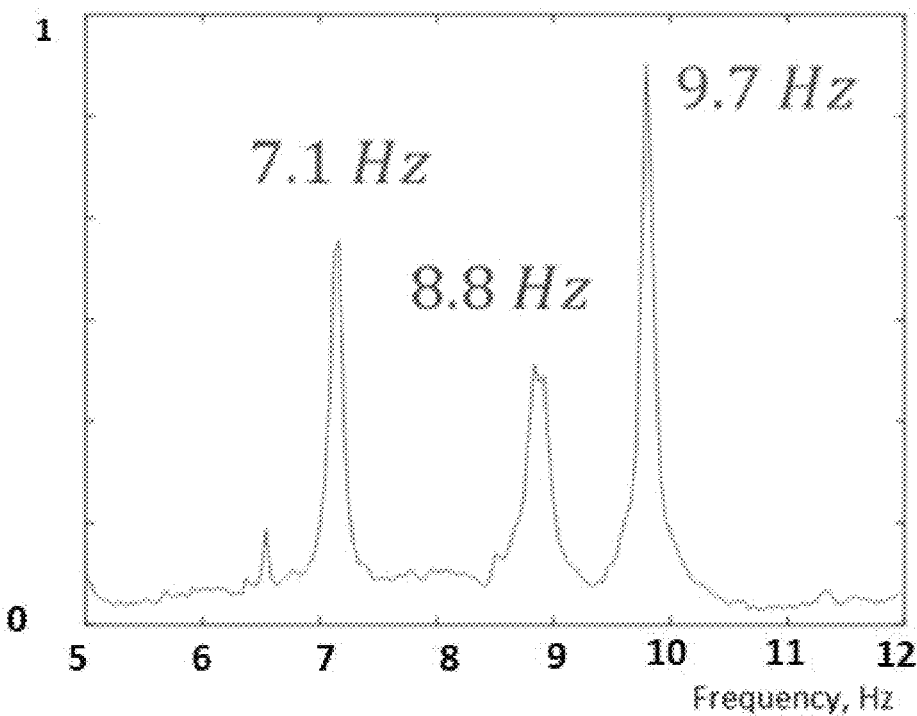

An example of the solution vector a is shown in FIG. 3B. The peaks corresponding to the fundamental frequencies from three distinct sources are clearly identified in FIG. 3B, while the initial magnitude response shown in FIG. 3A a is contaminated with their harmonics.

Figure 4A:
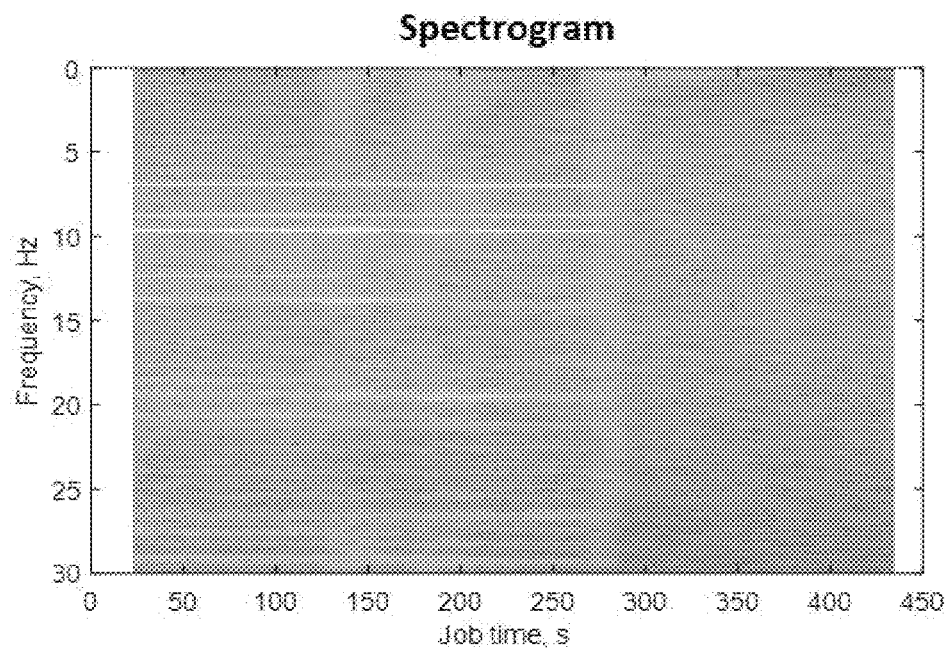
FIG. 4A shows a spectrogram of the wellhead pressure magnitude response.

In our case the wellhead pressure being non-stationary signal is analyzed in overlapping segments, that requires performing the analysis in each segment. The Fourier transform computed in each of these segments is called Short Time Fourier Transform (STFT). The magnitude frequency responses computed as absolute value of STFT, form the image called spectrogram (FIG. 4A).

Figure 4B:
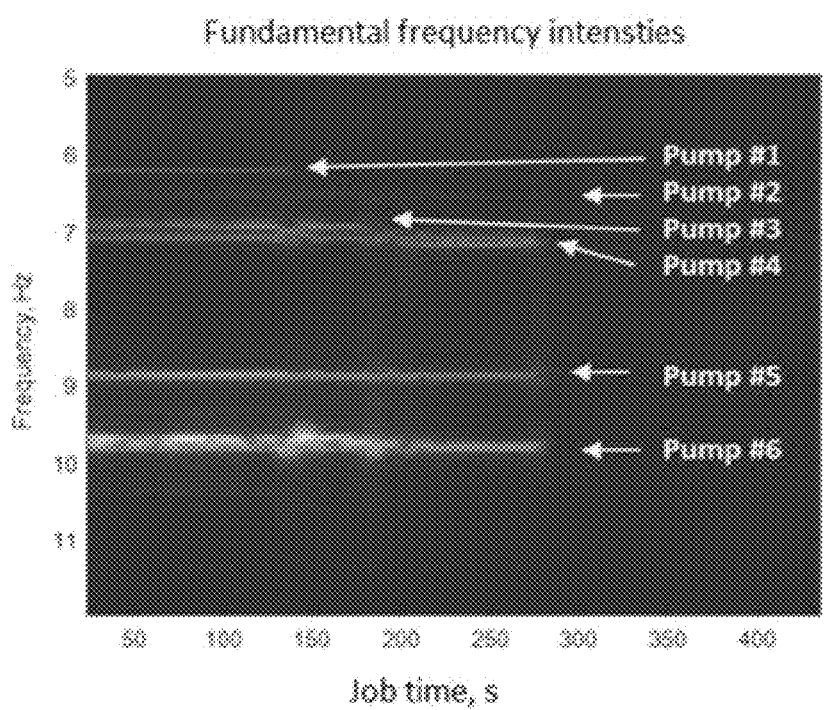
FIG. 4B shows fundamental frequency intensities obtained from the magnitude response.

Columns of the spectrogram serve as the right-hand side vector h for the linear system (5) and multiple solutions a of the system (6) produce the fundamental frequency intensity image shown in FIG. 4B. Each fundamental frequency trace on FIG. 4B corresponds to an individual hydraulic pump.

Figure 5A:
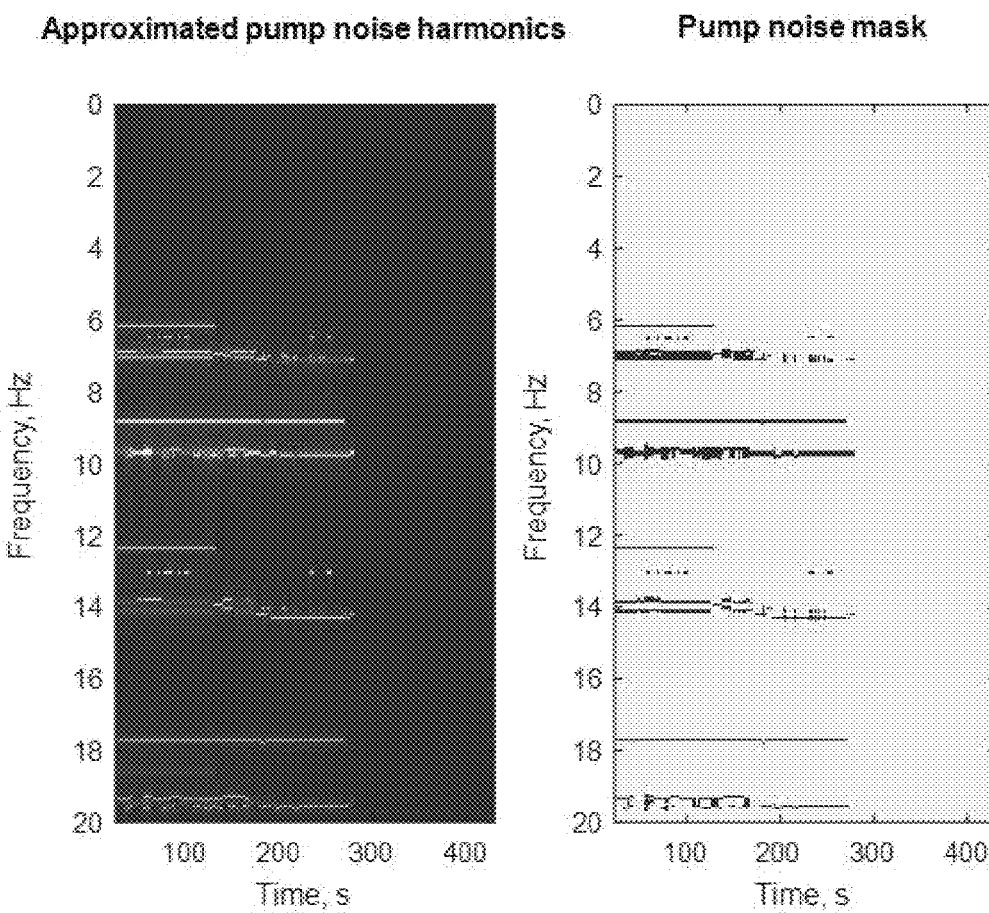
FIG. 5A shows pump noise harmonics approximation needed for construction of pump noise mask.
Figure 5B:
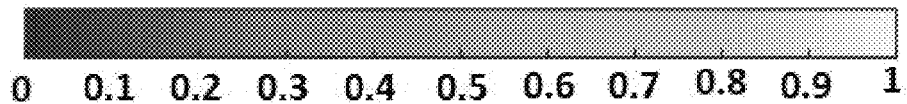
FIG. 5B shows pump noise mask creation.
Figure 6:
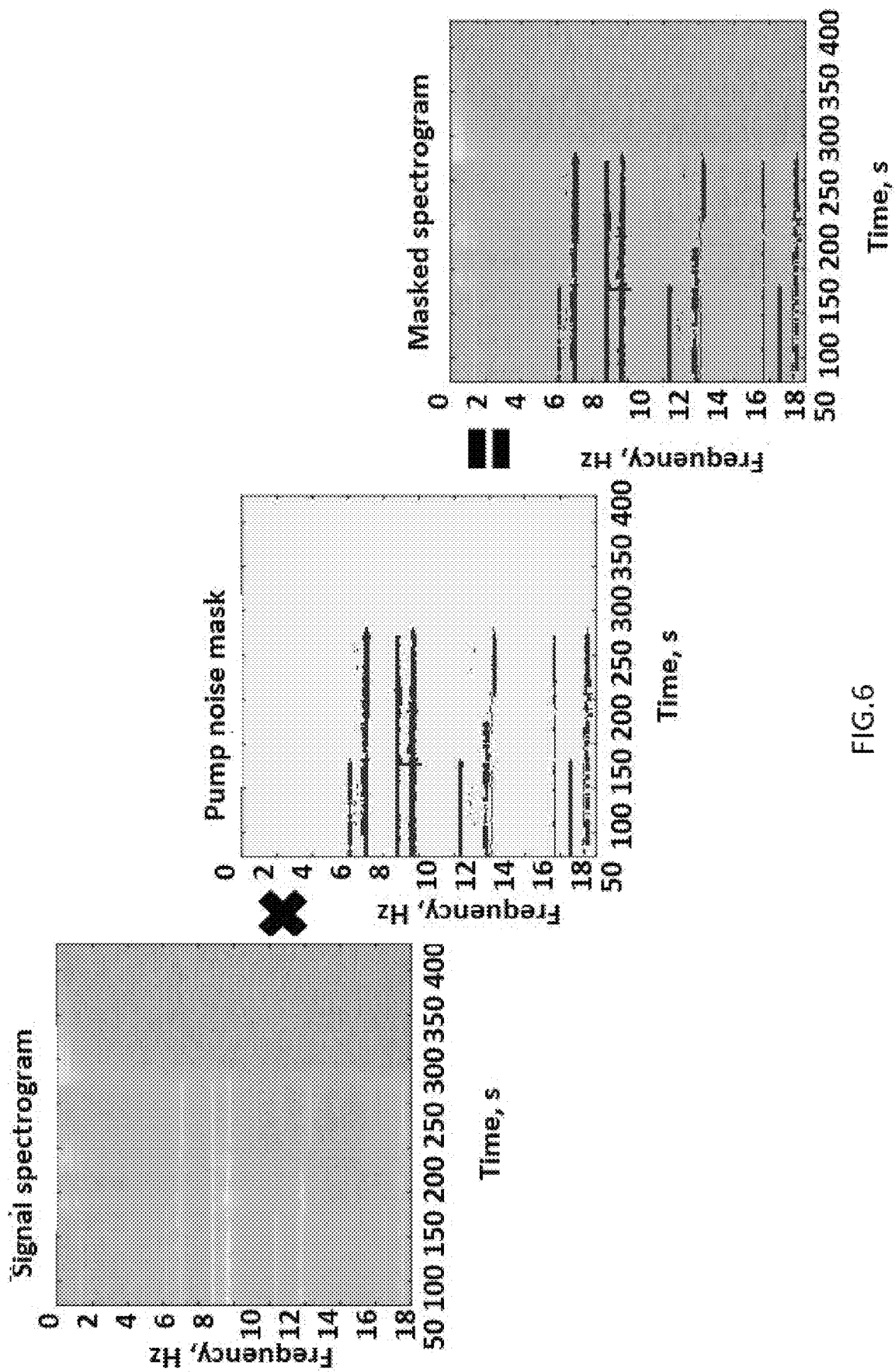
FIG. 6 shows pump noise filtration by applying of the mask.

Substitution of regularized least square solutions system (6) α into (5) produces the pump noise harmonics approximation illustrated in FIG. 5A. To filter out the pump noise from the signal in frequency domain the mask is illustrated in FIG. 5B) and it is constructed as follows:

Pump noise isolation. An intensity threshold is introduced for the pump noise approximation. Only the intensities above the threshold are considered as pump noise; the rest of the values are set to zero.

Figure 8:
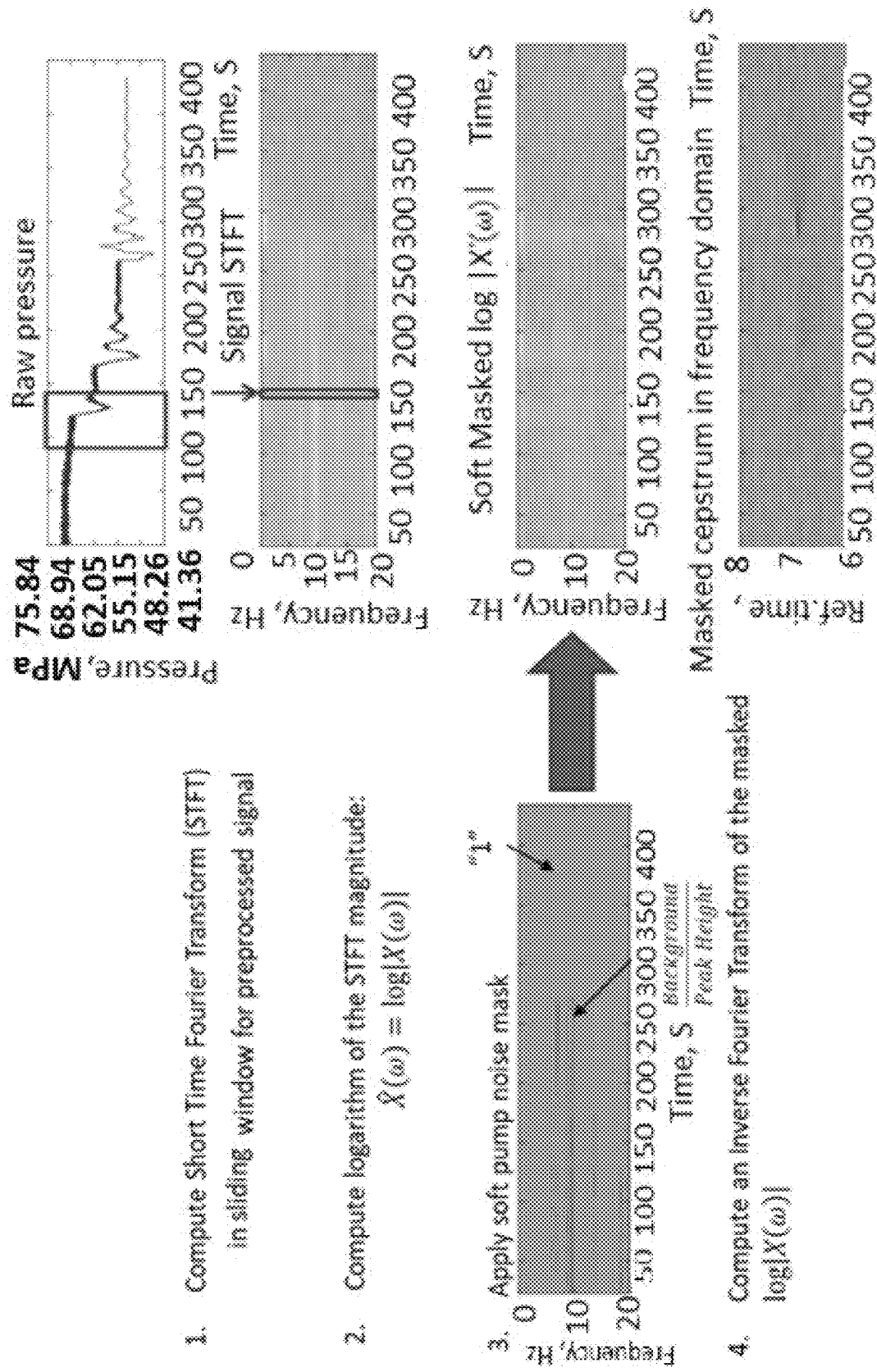
FIG. 8 shows modified cepstrum analysis workflow with embedded pump noise masking.

Pump noise mask determination. The mask has same dimensions as the spectrogram. It is applied to the STFT or spectrogram by element-wise multiplication as it is illustrated in FIG. 8. Its role is preserving the useful signal and removing of the unwanted noise. Two alternatives will be considered:

Hard Mask

The mask elements that correspond to the pump noise identified at previous stage are set equal to zeros. The rest are set to one.

Soft Mask

The mask elements that correspond to the pump noise identified at the previous stage are set equal to the background spectrum divided by harmonic amplitudes. The rest are set to one.

Embedding the Masking Filter

Traditionally, in speech processing the SIFT of a signal is computed, then the mask is applied to the STFT (which is two-dimensional array of complex numbers), then after performing of Inverse Short Time Fourier Transform (ISTFT) on the masked two-dimensional STFT the filtered one-dimensional signal is obtained. The filtered signal, in turn, can serve as an input to the next processing stage.

Figure 7:
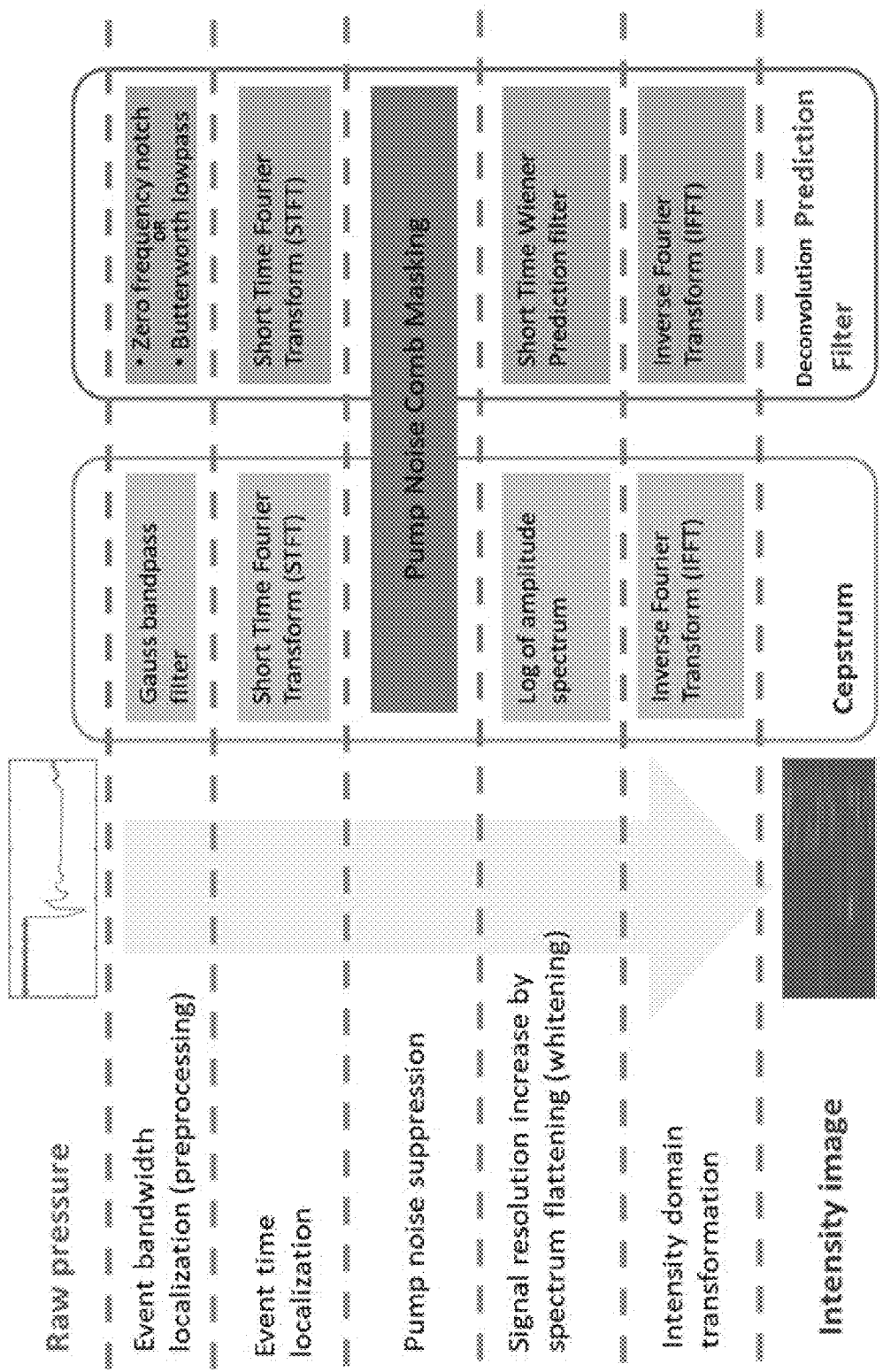
FIG. 7 shows data processing workflow common both for cepstrum and Wiener prediction filter.

This approach is obviously redundant when applied either to currently used for wellhead pressure processing cepstrum algorithm or predictive deconvolution algorithm. To illustrate that and establish better option to embed the comb masking filter let us consider the data processing workflow common for both approaches shown in FIG. 7.

Both processing algorithms take the raw wellhead pressure signal comprising a useful signal and a pump noise signal as an input; then performed is preprocessing the obtained wellbore pressure signal to localize the at least one useful signal in frequency domain. The preprocessing of the obtained wellbore pressure signal is performed by applying a bandpass filter implemented as one of Gaussian derivative bandpass filter, zero frequency notch filter, or Butterworth lowpass filter or their combination. The Gaussian derivative bandpass filter and Butterworth lowpass filter having a bandwidth 10-20 Hz; the STFT that goes next allows to consider the signal as stationary in short segments and detect the events by localizing the segments with highest response; then the signal resolution is increased by signal spectrum flattening (also known as "whitening", by using Log of amplitude spectrum in case of cepstrum embodiment; or by using Short Time Wiener Prediction filter); finally, resulted two-dimensional array is inversely Fourier transformed back to cepstral domain (or time domain in case of the prediction filter) to get the two-way reflection time by tracing the most intensive peaks.

The pump noise suppression stage readily fits the workflow right after STFT computation stage. The mask is computed basing on and applied to the STFT output. Detailed workflows for each processing algorithm are described in corresponding FIG. 7.

Cepstrum Algorithm

The cepstrum pressure data processing algorithm workflow based on cepstrogram computation is described in WO2018004369. The modified workflow is shown in FIG. 8. At the first stage, the raw signal is preprocessed by applying a bandpass filter implemented as one of Gaussian derivative bandpass filter, or a combination of zero frequency notch filter and Butterworth lowpass digital filter, while the STFT is computed in a sliding window. Then the element-wise logarithm of the STFT magnitude is computed using expression:

$$\hat{X}(\omega) = \log|X(\omega)|.$$

The soft mask is computed and applied to the STFT magnitude obtained at previous stage. At the last stage the inverse Fourier transform yields the masked cepstrum.

Short Time Predictive Deconvolution

The short time predictive deconvolution processing workflow based on prediction operator computation in frequency domain is described in "Measurements While Fracturing: Nonintrusive Method of Hydraulic Fracturing Monitoring. SPE-189886" (Parkhonyuk et al, 2018).

Figure 9:
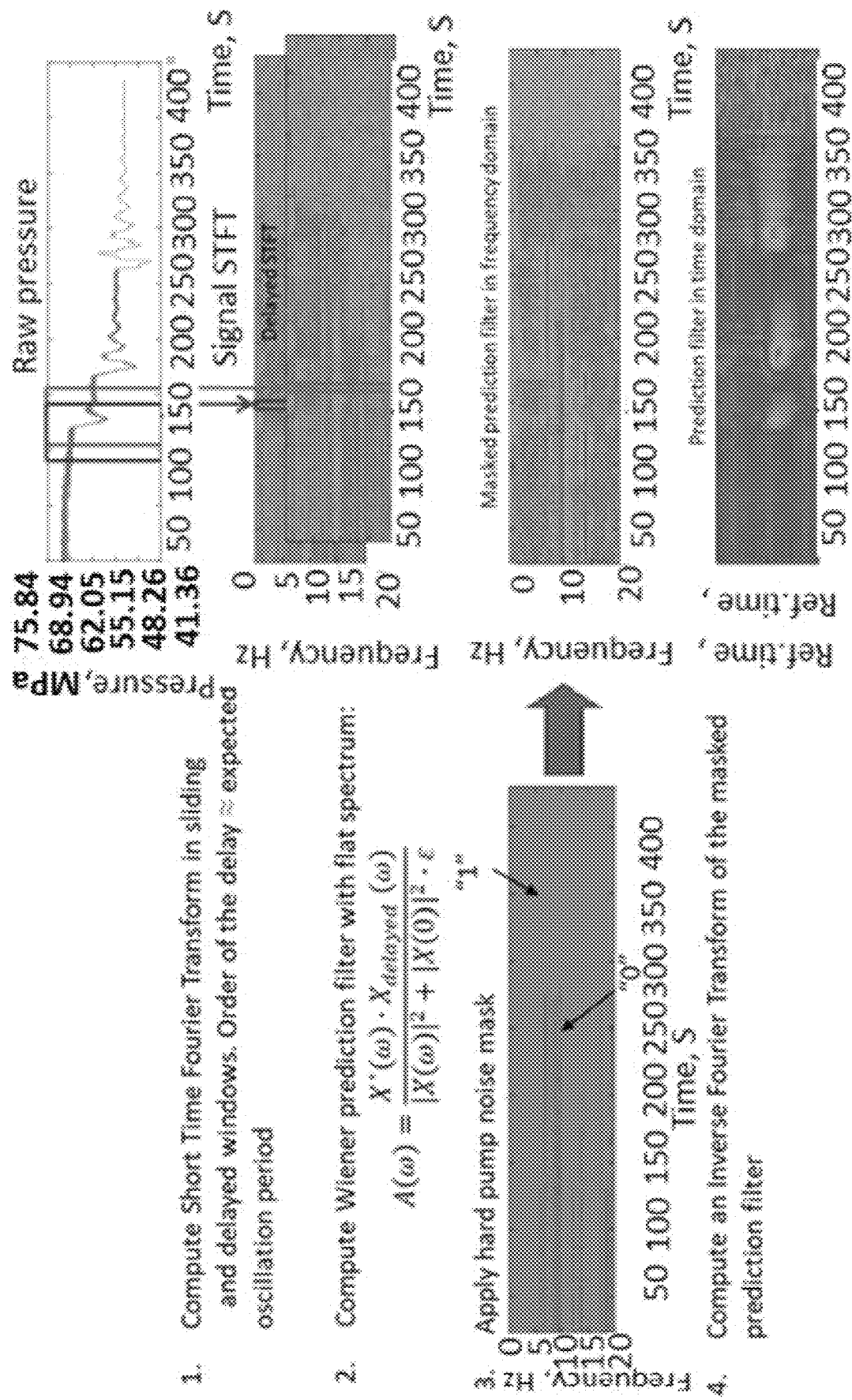
FIG. 9 shows Modified Short Time Prediction Filter workflow with embedded pump noise masking.

The modified workflow is shown in FIG. 9. At the first stage the raw signal is preprocessed by applying a bandpass filter implemented as one of Gaussian derivative bandpass filter, zero frequency notch filter, or Butterworth lowpass filter or their combination, wherein the Gaussian derivative bandpass filter and Butterworth lowpass filter having a bandwidth 10-20 Hz. Then plain and delayed STFTs are computed.

The order of the delay between the signals in the sliding window and the delayed sliding window is equal to an expected oscillation period. Then the spectrum flattening is performed by computing of the element-wise logarithm of the STFT magnitude by using the following expression:

$$A(\omega) = \frac{X^*(\omega) \cdot X_{delayed}(\omega)}{|X(\omega)|^2 + X(0)|^2 \cdot \varepsilon}$$

The hard mask is computed based on signal STFT magnitude and applied to the prediction operator computed in frequency domain. At the last stage the masked prediction filter is inversely Fourier transformed to time domain to produce reflected signal intensity plot.

Examples

The goal of this section is to demonstrate performance of the cepstrum and predictive deconvolution algorithms implemented with use of the new pump noise masking approach by comparison with the existing cepstrum algorithm with bandpass preprocessing described in (SPE-189886, Parkhonyuk et al, 2018).

From the description of method for processing of reflected signals propagating in a wellbore, a wide class of downhole objects can be monitored: a point of receiving the fracturing fluid into a fracture (so called fluid entry point); identifying the wellbore screenout; or pipe string leakage sites. All those objects can be monitored at the background of noise from operating pumps, which is convenient for well operators.

To evaluate the new algorithms, the dataset of almost 900 water hammer events generated at end of stages was processed. An illustration of sample stage down water hammer event processing is shown in FIG. 10A-10C. The comb filtering effectively removes the pump noise in both signal intensity images processed by predictive deconvolution (FIG. 10A) and cepstrum (FIG. 10B) comparing to the traditional cepstrum with adaptive bandpass preprocessing approach (FIG. 10C). This results in weakly traced signal for traditionally processed signal intensity plot (shown at the right image). One sees the obvious advantage: predictive deconvolution produces less noisy background than the comb filtered cepstrum processing and more pronounced reflected signal comparing to comb filtered cepstrum. Although, the comb filtered cepstrum produced narrower peaks than predictive deconvolution, their scatter over the interval comparable with the width of peak obtained by predictive deconvolution.

Figures 11A, 11B, 11C:
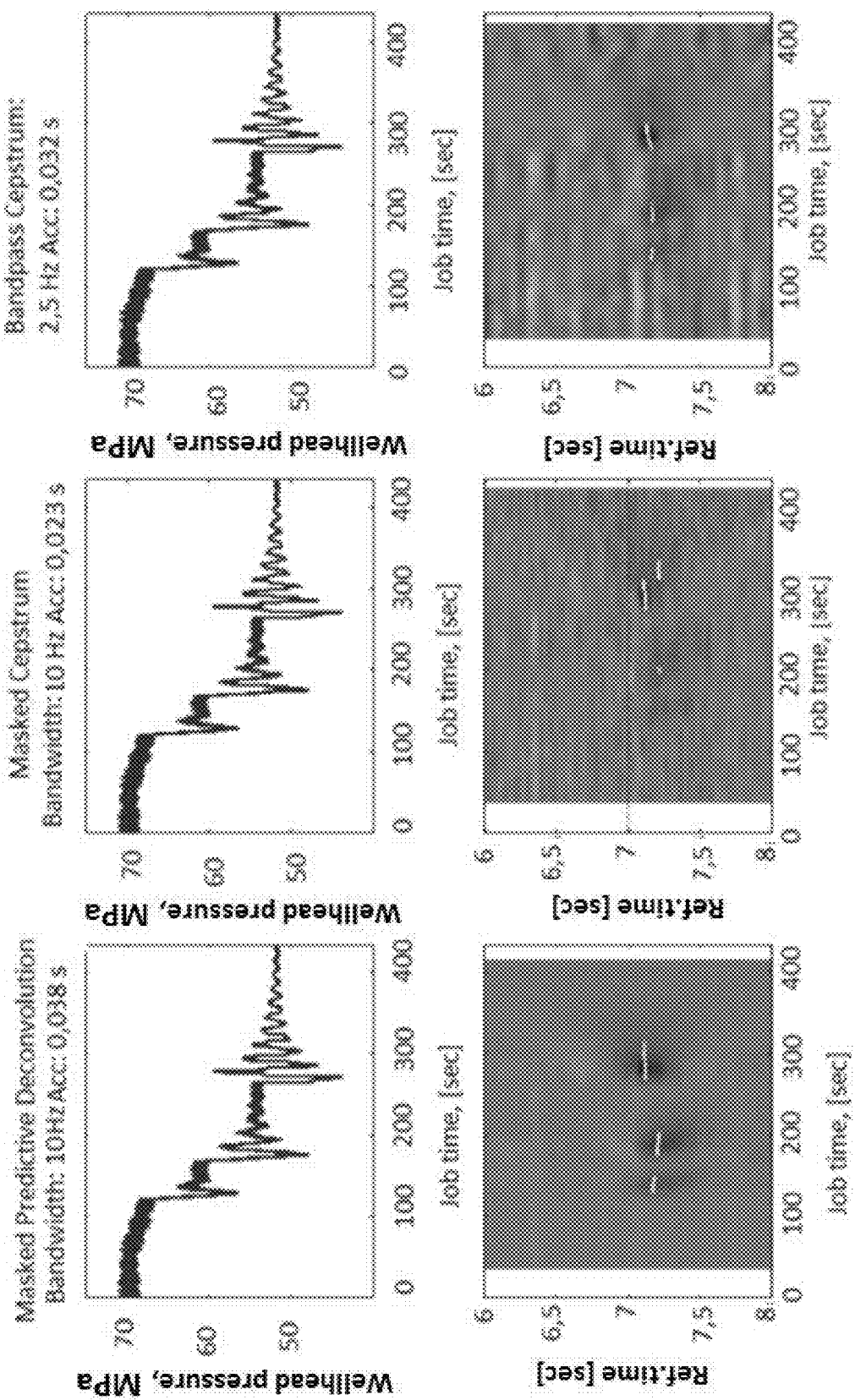
FIG. 11A shows an example of processing of the stage-down water hammer by predictive deconvolution with comb filter.
FIG. 11B shows an example of processing by cepstrum with comb filter.
FIG. 11C shows an example of processing by cepstrum filtered with adaptive bandpass.

Another example of water hammer in a wellbore produced by pumping of a diversion pill is shown in FIG. 11A-11C. This observation is contaminated with the noise of a pump that was still running during the pressure oscillations. Results are very similar to the ones shown in the previous example: all three processing algorithms produce responses that have similar shapes; predictive deconvolution produces solid, but wide peaks (FIG. 11A), while cepstral peaks in both cases are scattered by horizontal lines attributed to noise. In other words, both methods give same level of accuracy related to the signal bandwidth, but in different way: predictive deconvolution produces more stable result, but with lower resolution, while cepstrum processing offers better resolution, but less reliability.

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g., various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example, only a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A user may enter commands and information into the computing unit through the user interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the user interface that is coupled to a system bus but may be connected by other interface and bus structures, such as a parallel port or a universal serial bus (USB). A monitor or other type of display device may be connected to the system bus via an interface, such as a video interface. A graphical user interface ("GUI") may also be used with the video interface to receive instructions from the user interface and transmit instructions to the processing unit. In addition to the monitor, computers may also include other peripheral output devices such as speakers and printer, which may be connected through an output peripheral interface.

Although many other internal components of the computing unit are not disclosed, those of ordinary skill in the art will appreciate that such components and their interconnection are well known.

While the present disclosure has been described in connection with presently preferred embodiments, it will be understood by those skilled in the art that it is not intended to limit the disclosure to those embodiments.

It is therefore, contemplated that various alternative embodiments and modifications may be made to the disclosed embodiments without departing from the spirit and scope of the disclosure defined by the appended claims and equivalents thereof

The invention claimed is:

1. A method of monitoring a position of a wellbore object, comprising:
   a) providing at least one pump for performing hydraulic fracturing that causes a pressure signal to propagate along the wellbore and reflect from the wellbore object, thereby creating multiple reflected pressure signals;
   b) providing a pressure sensor at a wellhead for registering the reflected pressure signals;
   c) preprocessing the reflected pressure signals and pump noise;
   d) transforming the reflected pressure signals and the pump noise from a frequency domain into a time-frequency representation with a Short Time Fourier Transform (STFT);
   e) computing a pump noise mask by approximating a pump noise signal in the STFT representation with a linear combination of comb shape functions;
   f) applying the pump noise mask to the STFT representation of the reflected pressure signals and the pump noise obtained at stage (d) to suppress the pump noise and to obtain a filtered reflected pressure signal;

g) processing the filtered reflected pressure signal and determining a reflection time from the wellbore object; and h) calculating a depth of the wellbore object from the filtered reflected pressure signals by multiplying the reflection time by a filtered reflected pressure signal propagation velocity.

2. The method of claim 1, wherein the pressure signal is further caused by a hydraulic pulse from perforation shots.

3. The method of claim 1, wherein the pressure signal is caused by a water hammer due to a pump stop or start or due to a change in pump flow rate.

4. The method of claim 1, wherein processing of the filtered reflected pressure signal is performed through cepstrum processing comprising calculating a natural logarithm of absolute magnitude of the STFT representation and followed by an inverse Fourier transform.

5. The method of claim 1, wherein processing of the filtered reflected pressure signals is performed through predictive deconvolution comprising: calculation of STFT of a minimum phase version of the signal; calculation of STFT of a minimum phase version of a delayed signal; and calculation of a prediction operator in the frequency domain followed by application of an inverse Fourier transform.

6. The method of claim 1, wherein the wellbore object comprises a hydraulic fracture, a wellbore tool, a well bottom, casing pipes of different diameters, or an obstacle preventing direct propagation of the pressure signal.

7. The method of claim 1, wherein preprocessing of the reflected pressure signals and the pump noise is performed by applying a bandpass filter selected from a Gaussian derivative bandpass filter, or a combination of a zero frequency notch filter and a Butterworth lowpass digital filter.

8. The method of claim 1, wherein processing the filtered reflected pressure signal for determining the reflection time of the wellbore object is used for monitoring a point of receiving a fracturing fluid into a fracture; identifying a wellbore screenout and pipe string leakage.

9. A system for monitoring a wellbore object using reflected pressure signals, comprising:
at least one pump configured to perform hydraulic fracturing and generate a pressure signal that propagates along a wellbore and reflects from the wellbore object;
a pressure sensor positioned at a wellhead and configured to register the reflected pressure signals; and
a processing system configured to:
preprocess the reflected pressure signals and pump noise;
transform the reflected pressure signals and the pump noise from a frequency domain into a time-frequency representation with a Short Time Fourier Transform (STFT);
compute a pump noise mask by approximating a pump noise signal in the STFT representation with a linear combination of comb shape functions;
apply the pump noise mask to the STFT representation of the reflected pressure signals and the pump noise to suppress the pump noise and obtain a filtered reflected pressure signals;
process the filtered reflected pressure signal for determining a reflection time from the wellbore object;
calculate a depth of the downhole object from the reflected pressure signals by multiplying the reflection time by a pressure signal propagation velocity.

10. The system of claim 9, wherein the pressure signal is further caused by a pressure pulse from perforation shots.

11. The system of claim 9, wherein the pressure signal is caused by a water hammer due to a pump stop or start or due to a change in pump flow rate.

12. The system of claim 9, wherein the processing system is configured to process the filtered reflected pressure signal by applying cepstrum processing comprising calculating a natural logarithm of absolute magnitude of the STFT representation and followed by an inverse Fourier transform.

13. The method of claim 9, wherein the processing system is configured to process the filtered reflected pressure signal by applying predictive deconvolution comprising: calculation of STFT of minimum phase version of the filtered reflected pressure signals; calculation of STFT of a minimum phase version of delayed signals; and calculation of a prediction operator in the frequency domain followed by application of an inverse Fourier transform.

14. The method of claim 9, wherein the wellbore object comprises a hydraulic fracture, a wellbore tool, a well bottom, casing pipes of different diameters, or an obstacle preventing direct propagation of the pressure signal.

15. The method of claim 9, wherein the processing system is configured to preprocess the reflected pressure signals and the pump noise by applying a bandpass filter selected from a Gaussian derivative bandpass filter, or a combination of a zero frequency notch filter and a Butterworth lowpass digital filter.

16. The method of claim 9, wherein the processing system is configured to process the filtered reflected pressure signal for determining the reflection time of the downhole object for monitoring a point of receiving a fracturing fluid into a fracture, identifying a wellbore screenout or pipe string leakage.

* * * * *